March 10, 1970  P. H. JOHNSON  3,499,947
ELECTROTHERMIC FLUIDIZED BED PROCESS
Filed Aug. 5, 1966
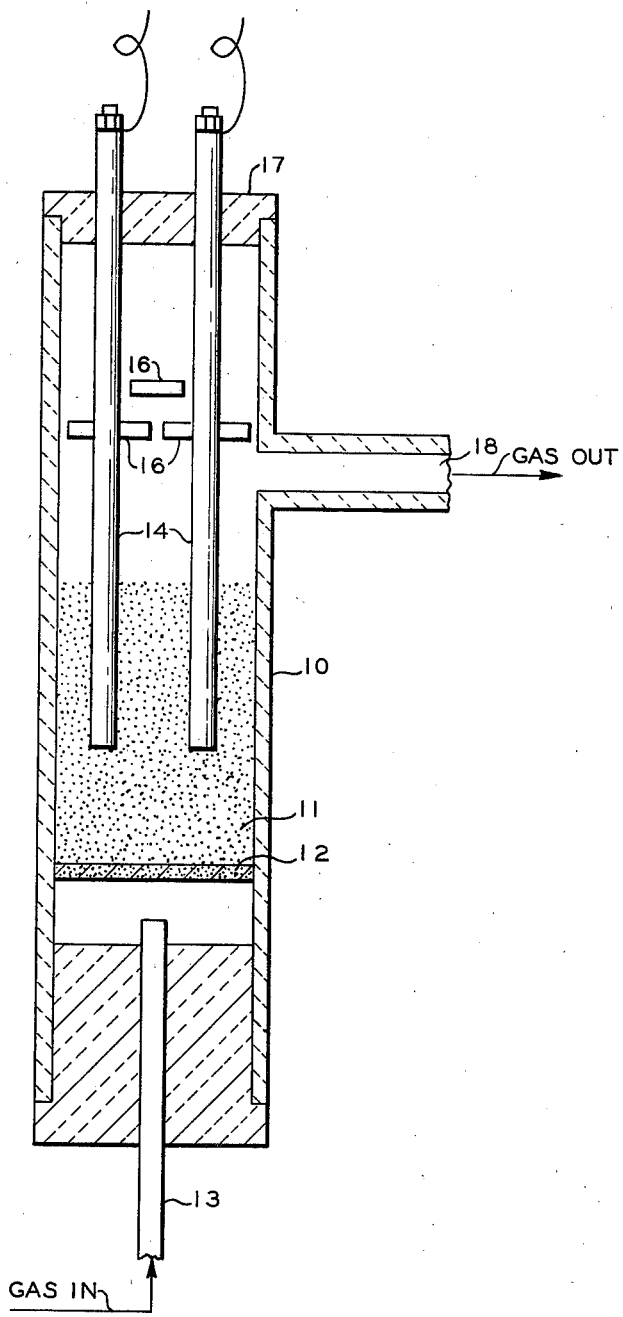
INVENTOR
P. H. JOHNSON
BY
*Younge Jugg*
ATTORNEYS

United States Patent Office 3,499,947
Patented Mar. 10, 1970

3,499,947
ELECTROTHERMIC FLUIDIZED BED PROCESS
Paul H. Johnson, Bartlesville, Okla., assignor to Phillips Petroleum Company, a corporation of Delaware
Filed Aug. 5, 1966, Ser. No. 570,665
Int. Cl. C07c 5/18; B01j 9/22; C10g 11/18
U.S. Cl. 260—680                                    5 Claims

ABSTRACT OF THE DISCLOSURE

Catalytic reactions are conducted in an electrothermic fluidized bed apparatus by adding a catalyst having same "fluidization" characteristics as the conductive material to a fluidized bed of electrically conductive material.

---

This invention relates to a process for conducting chemical reactions in an electrothermic fluidized bed. In one aspect it relates to conducting chemical reactions at high temperatures in an electrothermal fluidized bed apparatus having a catalyst added to the bed. In another aspect it relates to a process for performing chemical reactions in a fluidized electrically conductive bed by adding to the bed catalyst particles having the same fluidizing characteristics as the electrically conductive particles so that a homogeneous fluidized bed is maintained. In another aspect it relates to a method for conducting dehydrogenation, isomerization, reforming, and polymerization reactions at high temperatures in an electrothermic fluidized bed by adding to that bed catalysts suitable for the particular reaction desired. In still another aspect it relates to a method of performing chemical reactions in an electrothermic fluidized bed involving a solid reactant by incorporating particles of the solid reactant and particles of a catalyst in the bed, along with the conductive particles, and fluidizing the bed with an inert gas. In still another aspect it relates to a method of performing chemical reactions in an electrothermic fluidized bed containing a catalyst by fluidizing the bed with a gas which undergoes chemical conversion during passage of the gas through the bed due to the presence of the catalyst. In still another aspect it relates to a method of utilizing electrically nonconductive catalysts in an electrothermic fluidized bed process by incorporating the nonconductive catalyst with an electrically conductive bed of material. In yet another aspect it relates to a method for preforming catalytic electrothermic fluidized bed reactions on a bed comprised of catalyst particles incompletely coated with an electrically conductive material. In another aspect it relates to a method for performing catalytic electrothermic fluidized bed reactions using a bed comprising particles of electrically conductive material incompletely coated with a catalyst. In a specific aspect, it relates to the production of butene and butadiene by passing butane through an electrothermal fluidized bed containing a dehydrogenation catalyst.

Electrothermal fluidized bed reactions were suggested in 1932 by F. Winkler in U.S. Patent 1,857,799. Winkler provided a bed of coke, and fluidized the bed by passage of steam therethrough. By means of electrodes on opposite sides of his reactor, he passed an electrical current through the bed of fluidized coke. The electrical resistance of the coke to passage of the current produced a rapid heating of the coke bed to a temperature of about 750° C., at which temperature the coke reacted with the steam to form water gas.

Since Winkler's invention, the apparatus for conducting electrothermic reaction has been improved and sophisticated. Various reactions have been prosposed in such an apparatus, including the manufacture of hydrogen cyanide, carbon disulfide, titanium tetrachloride, carbon monoxide, and phosphorus. Temperatures as high as 8,000° F. have been achieved when using reducing atmospheres in the reactor, and temperatures around 3,000° F. when oxidizing atmospheres are present.

Basically, the electrothermic fluidized bed processes in use today are essentially the same as was developed by Winkler. All of the reaction processes which have been suggested involve either a reaction between the fluid passing through the bed and the carbon, or they involve the passage of gases which are inert to the carbon, but which undergo some sort of chemical conversion due entirely to the high temperature of the reactor bed. In the latter case the bed is used solely as a resistance heater. The scope of reactions possible in the electrothermic fluidized bed has not heretofore been expanded beyond these two categories of reactions.

It is therefore an object of my invention to expand the category of reactions which can take place in an electrothermic fluidized bed. It is a further object of my invention to provide a method for conducting various types of catalytic chemical reactions in an electrothermic fluidized bed. It is a further object of my invention to use electrically nonconductive catalysts in an electrothermic fluidized bed. It is a still further object of my invention to provide a process for the dehydrogenation, isomerization, reforming and polymerization of hydrocarbons in an electrothermic fluidized bed. It is a specific object of my invention to provide a method for the production of butene and butadiene from butane in an electrothermic fluidized bed. These and other objects are achieved by the process of my invention as set forth in the specification, drawing and appended claims.

According to the invention, a catalyst is added to an electrothermic fluidized bed. This catalyst can be in the form of particles, in which case the particles will have the same "fluidizing" character as the particles of the electrically conductive material in the bed so that the bed will remain homogeneous during fluidization. In other words, the levitation characteristics of both catalyst particles and the conductive particles are the same when under the influence of the fluidizing gas. Therefore, when the bed is fluidized by the gas, there will be no separation or stratification of the different particles. Both density and size of the particles must be considered in choosing the proper particle size of a particular catalyst to match the fluidizing characteristics of the conductive material.

It is also within the scope of this invention to form a bed of coated particles. The particles may be particles of catalyst partially coated with an electrically conductive material. This coating can be accomplished by carbonization of the hydrocarbon gas at high temperatures while passing the gas through a bed of the catalyst particles. It is, of course, essential that the catalyst particles not be completely coated with carbon, or else the catalytic effect would be lost.

It is further within the scope of this invention to provide electrically conductive particles which are partially coated with the catalyst. Such a catalyst could be formed, for example, by vapor phase deposition of a metal catalyst on carbon black pellets. A catalyst could also be sprayed onto the pellets, or deposited from a solution.

The temperatures available for performing reactions in accordance with the process of my invention are limited only by the particular materials which are put in to the bed. Any temperature up to the decomposition point of the catalyst, the conductive material, or the reactor construction materials can be used.

The residence time of gases in the reactor can be varied in accordance with the particular chemical reaction which is being conducted. Mean residence times between 0.1 and 10 seconds are common, but a wide residence time distribution will be obtained for any nominal residence time.

The normal reactions performed by the process of my invention would be those reactions involving the chemical conversion of a gaseous material while it passes through the bed. However, it is also within the scope of my invention to add to the fluidized bed itself solid particles which will undergo conversion at the temperatures which will be attained in the reactor bed. In general, the solid particles would break down at the temperatures involved to yield a gaseous product. This gaseous product would then be acted upon by the catalyst present in the bed to give the final product. In such an application, an inert gas, such as nitrogen, would be used to fluidize the bed. It would be possible, however, to use a reactive gas which will undergo chemical interaction with the gaseous product released from the solid particles initially in the bed.

The operation of the process of my invention can be seen by reference to the attached drawing. The outer wall 10 of the reactor is formed of a suitable refractory material such as high temperature resistant glass, aluminum, or graphite. A bed 11 comprised of an electrically conductive material and a catalyst is disposed on gas disperser 12. Gas is introduced through conduit 13 at sufficient velocity to maintain bed 11 in a fluidized condition. Current is passed through the fluidized bed between graphite electrodes 14. The amount of current passing through the fluidized bed, and consequently the temperature which is attained in the bed can be controlled by the depths of immersion of the graphite electrodes into the bed.

Radiation shields 16 protect end seal 17, which can be of asbestos, or other temperature resistant material, from rapid degradation.

The product gas after passage through the fluidized bed is removed from the reactor through conduit 18.

The process of my invention can be used for various types of catalytic reaction. For example, it is possible to polymerize olefins using a catalyst of silica alumina base promoted by an oxide of chromium, tungsten, or manganese as disclosed in U.S. Patent 3,166,537 to Gregg et al. Isomerization of olefins can be conducted using a catalyst of a supported aluminum phosphate as is described in U.S. Patent 3,211,801 to Holm et al. Dehydrogenation reactions have also been conducted using various catalysts, such as the combination of iron oxide, potassium carbonate, and chromic oxide, as described in U.S. Patent 2,866,790 to Pitzer, as well as a newly developed catalyst system of antimony oxides and uranium oxides. Butene-1 and butene-2 can be successfully converted to butadiene in about a 30 percent yield per pass using the process of my invention.

Reasonable variation and modification are possible within the scope of the foregoing disclosure, the drawing and the appended claims to the invention, the essence of which is that a chemical reaction is conducted in an electrothermic fluidized bed containing a catalyst for the reaction.

I claim:
1. A process for conducting a chemical catalyzed reaction in a reactor formed of a high temperature resistant refractory material comprising heating said reactor by passing electrical current through a fluidized bed of particulate material in said reactor, said fluidized bed comprising a mixture of particles of electrically conductive material and particles of an electrically nonconductive metal-containing catalyst for said reaction, said metal-containing catalyst particles having the same fluidizing characteristics as the electrically conductive particles so that a homogeneous fluidized bed is maintained, and fluidizing said bed with a gas which undergoes chemical conversion during passage of the gas through the bed due to the presence of the catalyst.

2. The process of claim 1 wherein said bed further comprises solid particles which undergo chemical conversion during said reaction and at least a portion of the fluidizing gas is an inert gas.

3. The process of claim 1 wherein said gas is a hydrocarbon and said catalyst is a dehydrogenation, isomerization, reforming or polymerization catalyst.

4. A process for conducting a dehydrogenation reaction in a reactor formed of a high temperature resistant refractory material comprising heating said reactor by passing electrical current through a fluidized bed of particulate material in said reactor, said bed comprising a mixture of particles of electrically conductive material and particles of a dehydrogenation catalyst for said reaction, said dehydrogenation catalyst particles having the same fluidizing characteristics as the electrically conductive particles so that a homogeneous fluidized bed is maintained, and fluidizing said bed with a hydrocarbon gas which undergoes chemical conversion during passage of the gas through the bed due to the presence of the catalyst.

5. A process according to claim 4 wherein said hydrocarbon gas includes butane and butenes which are dehydrogenatable to butadiene and said catalyst contains chromia.

References Cited

UNITED STATES PATENTS

| | | | |
|---|---|---|---|
| 1,057,213 | 3/1913 | Benjamin | 48—65 |
| 1,857,799 | 5/1932 | Winkler | 48—65 X |
| 2,799,640 | 7/1957 | Pevere et al. | 204—171 |
| 3,304,249 | 2/1967 | Katz | 204—164 |
| 3,314,767 | 4/1967 | Bernstein | 23—284 |
| 1,400,959 | 12/1921 | Koetschet | 23—288.8 X |
| 2,921,840 | 1/1960 | Johnson | 23—204 |

OTHER REFERENCES

Hanway: "Electrothermal Fluidized Bed," Brit. Chem. Eng. 10(4) 258–60 (April 1965).

PAUL M. COUGHLAN, JR., Primary Examiner

G. E. SCHMITKONS, Assistant Examiner

U.S. Cl. X.R.

23—288; 208—163; 260—683.3